(12) United States Patent
Ghaffari et al.

(10) Patent No.: US 7,360,010 B2
(45) Date of Patent: Apr. 15, 2008

(54) METHOD AND APPARATUS FOR STORAGE COMMAND AND DATA ROUTER

(75) Inventors: Bahareh Ghaffari, Boulder, CO (US); Aloke Guha, Louisville, CO (US)

(73) Assignee: Copan Systems, Inc., Longmont, CO (US)

( * ) Notice: Subject to any disclaimer, the term of this patent is extended or adjusted under 35 U.S.C. 154(b) by 357 days.

(21) Appl. No.: 10/822,971

(22) Filed: Apr. 12, 2004

(65) Prior Publication Data

US 2004/0205288 A1 Oct. 14, 2004

Related U.S. Application Data

(60) Provisional application No. 60/462,336, filed on Apr. 14, 2003.

(51) Int. Cl.
*G06F 13/00* (2006.01)
*G06F 13/36* (2006.01)

(52) U.S. Cl. ........................ 710/316; 710/305
(58) Field of Classification Search .............. None
See application file for complete search history.

(56) References Cited

U.S. PATENT DOCUMENTS

| | | | | |
|---|---|---|---|---|
| 6,385,681 | B1 * | 5/2002 | Fujimoto et al. | 710/316 |
| 6,542,954 | B1 * | 4/2003 | Aruga | 710/316 |
| 6,542,961 | B1 * | 4/2003 | Matsunami et al. | 711/114 |
| 6,684,295 | B2 * | 1/2004 | Fujimoto et al. | 711/113 |
| 6,701,411 | B2 * | 3/2004 | Matsunami et al. | 711/114 |
| 6,850,998 | B2 * | 2/2005 | Inoue et al. | 710/38 |
| 6,961,813 | B2 * | 11/2005 | Grieff et al. | 711/112 |
| 2002/0095549 | A1 * | 7/2002 | Matsunami et al. | 711/114 |
| 2002/0095551 | A1 * | 7/2002 | Fujimoto et al. | 711/114 |
| 2003/0046460 | A1 * | 3/2003 | Inoue et al. | 710/38 |
| 2003/0110254 | A1 * | 6/2003 | Fujita et al. | 709/224 |
| 2003/0135577 | A1 * | 7/2003 | Weber et al. | 709/214 |
| 2004/0024950 | A1 | 2/2004 | Surugucchi | |
| 2004/0162926 | A1 * | 8/2004 | Levy | 710/74 |
| 2004/0252672 | A1 * | 12/2004 | Nemazie | 370/351 |

(Continued)

FOREIGN PATENT DOCUMENTS

WO    WO03091887 A1    11/2003

OTHER PUBLICATIONS

RSM 06-EXT: "Serial ATA II Specification Connectivity Expansion through RSM"; Apr. 30, 2002; 37 pages.

(Continued)

*Primary Examiner*—Paul R. Myers
*Assistant Examiner*—Ryan M Stiglic
(74) *Attorney, Agent, or Firm*—Brian N. Young; Trellis Intellectual Property Law Group, PC

(57) ABSTRACT

An interconnecting unit and method for data communication between a plurality of computer hosts and a plurality of storage devices. The interconnecting unit couples the hosts to the storage devices and enables the data communication. The interconnection includes a plurality device control units. Each of the device control unit allows multiple commands to be distributed to multiple storage devices. The communication through the interconnecting unit is strong enough to tolerate failure across one connection path between the hosts and the storage devices.

14 Claims, 9 Drawing Sheets

U.S. PATENT DOCUMENTS

2004/0252716 A1* 12/2004 Nemazie ................... 370/447
2005/0138258 A1*  6/2005 Seto ......................... 710/301
2005/0177680 A1*  8/2005 Miura ....................... 711/112
2005/0216680 A1*  9/2005 Levy ........................ 711/162
2005/0251588 A1* 11/2005 Hoch et al. ................. 710/5

OTHER PUBLICATIONS pm_1_1_Gold: "Serial ATA II: Port Multiplier"; Revision 1.1; Oct. 9, 2003; 36 pages.
pm_1_1_Gold: "Serial ATA II: Port Multiplier"; Revision 1.0RC; Feb. 3, 2003; 35 pages.

* cited by examiner

METHOD AND APPARATUS FOR STORAGE COMMAND AND DATA ROUTER

REFERENCE TO RELATED APPLICATIONS

This application claims the priority of U.S. Provisional Patent Application No. 60/462,336, entitled "Method And Apparatus For Storage Command And Data Router", by Ghaffari, et al., filed Apr. 14, 2003, which is incorporated as reference as of set forth herein in its entirety.

BACKGROUND

The present invention relates to data storage systems. Specifically, the present invention describes a routing device that provides the ability to concurrently route command and data over a serial storage link protocol in a data storage system.

The need for large data storage motivates the building of large-scale and high-capacity storage systems. A high capacity storage system requires a storage controller that enables a host to communicate with a large number of storage devices. A typical storage controller is a processor that receives a command from a host, and translates the command into a format, essential for communication with the storage devices. Currently, this communication is serial in nature. The serial communication is enabled by storage serial protocols such as Serial Advanced Technology Attachment (SATA), or Serially Attached SCSI (SAS), which employ a point-to-point connection. A storage controller that uses SATA or SAS-based protocol to communicate with the storage devices needs a switching or device control unit that interconnects the storage controller to the plurality of storage devices.

The communication between the host and the storage devices involves the exchange of command and data. The host sends a command to a storage device to perform a read or write operation. The read or write operation is performed after the storage device, to which the command is sent, has accepted the command. After the command has been accepted, the data can either be read out from the storage device, or a new data can be written into the storage device. This communication, based on the SATA or SAS-STP protocol, is made in the form of a "Frame Information Structure"(FIS). The FIS encapsulates the command and data being exchanged between the host and the storage device. Further details of FIS are described in serial ATA specification 1.0 described in the article "Serial ATA: High Speed Serialized AT Attachment", Aug. 29, 2001.

An interconnecting unit between the host and the storage devices enables the above-described communication. Two draft standards, based on SATA protocol, have been proposed for this interconnecting unit.

The first standard involves a port multiplier (PM) approach, which uses a multiplexer to multiplex an active host connection to up to 15 device connections. This enables utilization of the full bandwidth of the host connection. The PM approach requires the modification of the packet structure in SATA, in particular the FIS to incorporate the PM routing field. Consequently, either the host or the interconnecting unit has to be modified to produce PM FIS (FIS specific to the port multiplier).

The second standard involves a routers, switches and multiplexers (RSM) approach. This approach consists of an interconnecting unit that allows command and data information to be directed from one or more hosts to multiple storage devices. The interconnecting unit utilizes a wrapper FIS into which all other FIS types can be encapsulated. The wrapper FIS includes a header that is used to define and activate a connection between route-aware devices. However, this approach requires a SATA-based host or interconnecting unit to support RSM, in order to provide this connectivity. In addition, all the elements in the SATA-based interconnecting unit have to be RSM route aware and able to process the header to forward the encapsulated FIS.

The interconnecting unit, based on any of the above-described two approaches can be used to connect a plurality of storage devices to a plurality of hosts. This interconnecting unit contains multiple RSMs or multiplexers to connect the storage devices and the hosts.

An interconnecting unit is described in U.S. patent application No. US2004/0024950 titled 'Method and Apparatus for Enhancing Reliability and Scalability of Serial Storage Devices'. This patent application describes a method and system for data communication between a plurality of hosts and a plurality of storage devices. The communication is achieved by using a switch architecture-based interconnecting unit.

Another interconnecting unit is described in WIPO Publication No. WO03091887 titled 'Method and Apparatus for Dual Porting a Single Port Serial at a Disk Drive'. The patent describes a method and system to connect single port devices to a plurality of hosts. The invention provides a switched assembly to selectively connect a storage device to one of the plurality of hosts.

The above-mentioned interconnecting units suffer from one or more of the following limitations. First, the implementation of an interconnecting unit based on the PM or RSM approach requires changes to be made to the architecture of hosts, which is expensive to implement. The RSM system is expensive because it involves host modification. Further, the RSM system is not backward compatible with existing solutions, thus it also involves software changes. On the other hand, the cost of the port multiplier is dependent on the host design. A host that allows for commands to be sent to multiple devices can be very expensive. Consequently, the port multiplier is expensive although it has a relatively higher performance. The hosts that allow one command to be active at a time are not expensive and thus the port multiplier is not expensive. But, this host/PM solution has lower performance.

Secondly, the interconnecting unit, based on either approach, is very complex. For example, to connect 'm' hosts to 'n' number of storage devices, m*n multiplexers are required. As a result, the design complexity of the interconnecting unit increases substantially. Increased complexity results in the need for a larger chip area, and, consequently, high cost and high power consumption. Thirdly, the interconnecting unit allows a single command to be executed at a time. Even if the multiple hosts issue multiple commands at the same time, the interconnecting unit is able to execute only one command at a time. Consequently, the throughput of the interconnecting unit is low. Fourthly, the interconnecting unit will fail to operate where a failure is encountered in the path between a host and a storage device. This means that the communication is not reliable and robust enough to tolerate faults and thus lowers the storage device's availability.

In light of the above-described limitations, there is a need for a simple, cost-efficient interconnecting unit that enables a plurality of storage controllers to communicate with a large number of serially attached storage devices. The interconnecting unit should avoid changes in the architecture of the hosts, thereby reducing cost. Further, the interconnecting unit should have higher throughput and should allow reliable communication between the hosts and the storage devices. The mechanism should be strong enough to tolerate at least a single point of failure and not limit the availability of the storage devices in case of a fault.

SUMMARY

The present invention is directed at data storage systems. Specifically, the present invention is directed at a routing device that provides the ability to concurrently route command and data over a serial-storage link protocol in a data storage system.

An aspect of the present disclosure is to provide a system and method to enable connectivity between a plurality of hosts and a plurality of storage devices.

Another aspect of the present disclosure is to provide a system such that multiple commands can be distributed to the storage devices, thus having multiple storage devices active concurrently.

Another aspect of the present disclosure is a provision of fault identification and isolation to improve the time required to repair failures.

Another aspect of the present disclosure is a provision of load balancing between the hosts.

Another aspect of the present disclosure is a provision of data redundancy for error detection and correction.

Yet another aspect is a provision for data parallelism for increased performance.

The above aspects are attained by a data storage system comprising a plurality of hosts, a plurality of storage devices and an interconnecting unit for coupling the plurality of hosts and the plurality of storage devices. The interconnecting unit comprises a plurality of host interface units, a plurality of device control units, an interconnect routing unit and a plurality of device interface units. The device control unit enables distribution of multiple commands from a single host to more than one storage device. This is achieved by not requiring the device control unit to wait for the completion of the submitted command before allowing another command to be submitted, and by enabling queuing at the host layer. The device control unit also monitors the status of various components, thereby locating any fault that may occur during the communication between the hosts and the storage devices. The system and method of the present invention have numerous advantages over the prior art:

First, the device control unit is simple in design and its complexity is less, in comparison with existing device control units.

Second, the device control unit achieves a higher throughput than the existing device control units.

Third, the use of a plurality of device control units creates path redundancy as well as data parallelism.

Fourth, the invention improves the time for recovery in the case of failures.

Fifth, the present invention also allows a non-queue capable device, or a different generation of a storage device to be connected to a queue capable host.

Finally, the device control unit processes data destined for the storage devices. Data destined for the storage devices can be processed to produce error correction code (ECC) to provide data integrity, compression of the data to reduce actual storage, or encryption for data security reasons.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

For the sake of convenience, the terms used to describe various embodiments are defined below. It should be understood that these are provided to merely aid the understanding of the description, and that definitions in no way limit the scope of the invention.

Command—A command refers to a special packet structure such as a Frame Information Structure (FIS), whose payload contains an instruction. The commands are generated by the host and executed by the storage devices. The storage devices generate a status to report the result of the execution of the command to the host.

Data—Data is the user data that is written on a storage device or read from the storage device. A command initiates the read or write operation of data.

Serial I/O structure—A serial I/O structure comprises a command to a storage device, some or no data transfer, and a completion status from the storage device. The serial I/O structure contains all the bit data necessary to achieve a serial communication, referred to as primitives.

I/O Structure—Bit data on a 32 bit boundary that has been extracted from the serial I/O structure. This structure may contain a command, user data or status, and is free of any protocol used in the Serial I/O Structure necessary for communication in serial format, i.e. In the I/O structure the primitives of the Serial I/O structure are removed.

The present invention relates to a method and system for data storage between a plurality of hosts and a plurality of storage devices by using an interconnecting unit. In particular, the invention describes a device control unit that allows a plurality of commands from the hosts to be distributed concurrently to the plurality of storage devices.

Figure 1:
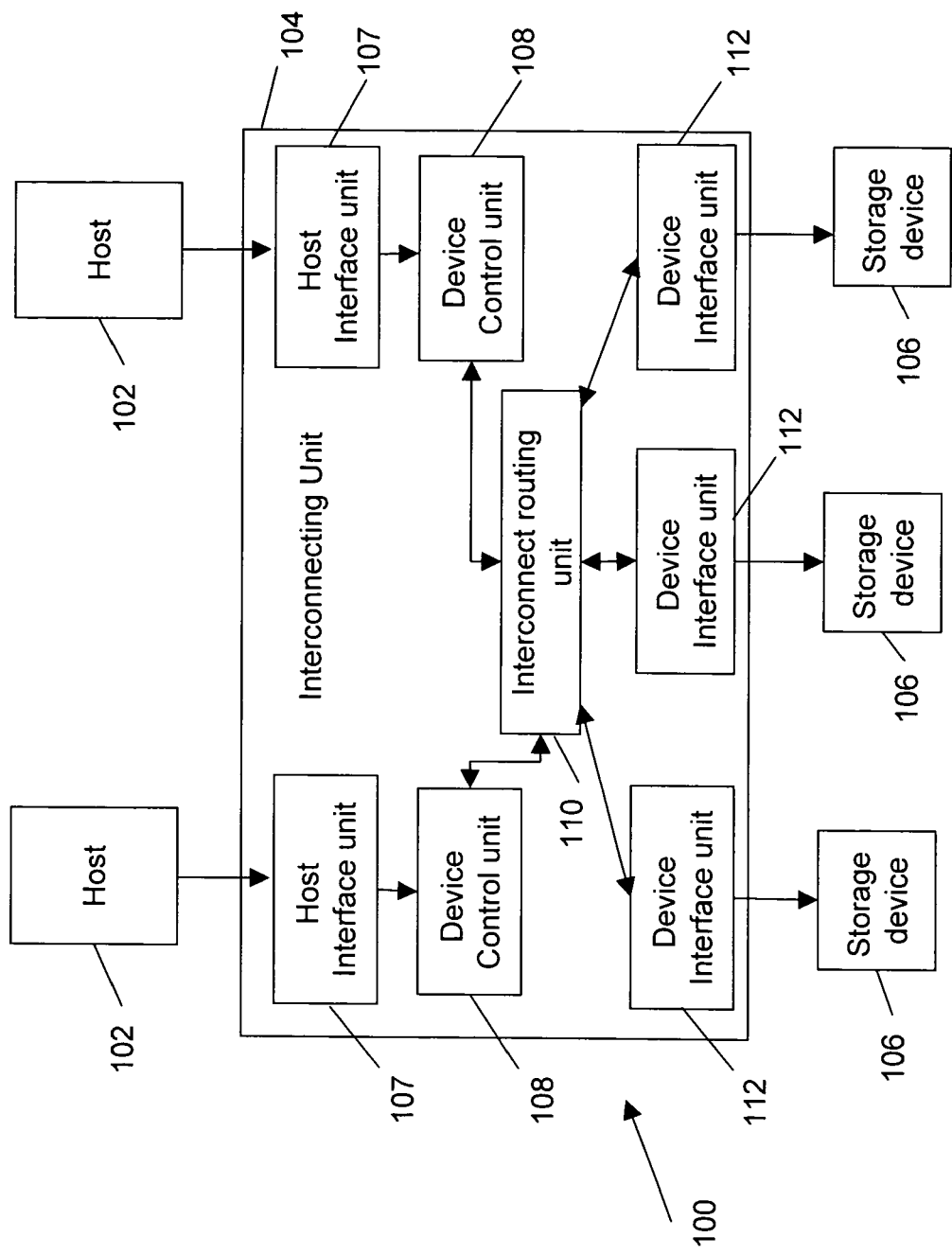
FIG. 1 illustrates a data storage system, in accordance with an embodiment of the present invention.

FIG. 1 is a block diagram illustrating a data storage system in accordance with the present invention. A data storage system 100 comprises an interconnecting unit 104 coupling a plurality of hosts 102 to a plurality of storage devices 106. The coupling comprises the exchange of serial I/O structures between plurality of hosts 102 and plurality of storage devices 106. Host 102 generates at least one command for coupling to at least one of plurality of storage devices 106.

The elements of serial I/O structure vary with the serial protocol used. For example, if SATA is used as the serial protocol, the serial I/O structure is composed of a command and status FIS, and if there is exchange of data, data FISes and any other FIS necessary for exchange of a data FIS. If the SAS-SCSI is used as the serial protocol, then the serial I/O structure is sent in the SCSI command structure format. For the purpose of illustration, the invention has been described using the FIS format for serial I/O structure although the invention is equally applicable to other I/O structures.

Each host 102 is queue capable, i.e., multiple commands can be transmitted without waiting for the completion of the previous commands in the queue. Interconnecting unit 104 is capable of processing the serial I/O structures for plurality of storage devices 106 and hosts 102 and establishing communication between one of storage devices 106 and host 102 based on a given fairness algorithm. An example of a fairness algorithm can be one wherein the order in which interconnecting unit 104 processes storage devices 106 is the order in which the commands are received from host 102. Another example is that interconnecting unit 104 processes the commands in the order in which plurality of storage devices 106 are ready to process them.

Interconnecting unit 104 comprises a plurality of host interface units 107, a plurality of device control units 108, an interconnect routing unit 110 and a plurality of device interface units 112. There is one device control unit 108 for each host 102. Each device control unit 108 communicates with host 102 and selects storage device 106 to which the received command is to be routed. Each device control unit 108 also controls interconnect routing unit 110 to route the serial I/O structure to device interface unit 112. In an embodiment of the present invention, interconnect routing unit 110 comprises a plurality of multiplexers, each multiplexer enabling connection between device control unit 108 and device interface unit 112 corresponding to selected storage device 106. There is a device interface unit 112 for each storage device 106. Device interface unit 112 establishes a point-to-point connection with storage device 106 until device control unit 108 selects device interface unit 112. After the selection, device control unit 108 handles the communication with storage device 106.

Please note that interconnect routing unit 110, using a plurality of multiplexers, ensures that input to each device control unit 108 can be received from any device interface unit 112, and output of each device control unit can go to any device interface unit 112.

It should be noted that in an embodiment of the invention, interconnecting unit 104 is implemented as a Field Programmable Gate Array (FPGA). In an alternate embodiment, interconnecting unit 104 can be implemented as an Application Specific Integrated Circuit (ASIC).

Host interface unit 107 and device interface unit 112 synchronize the serial data received from their respective connection to the running internal clock of device control unit 108 via an elasticity buffer. Synchronization is essential since device control unit 108, hosts 102 and storage devices 106 need not operate on the same clock, i.e., the clock rate need not be the same for device control unit 108, hosts 102 and storage devices 106. If the clock rates are the same, there is still a need for an elasticity buffer due to differences between the extracted clock from the physical interface (connecting a host 102 and interconnecting unit 104 as well as a storage device 106 and interconnecting unit 104) and the running internal clock of device control unit 108. Additionally, host interface unit 107 and device interface unit 112 extract the bits from the serial bit stream directed from host 102 and storage device 106 respectively. The bits are extracted in a character bit format such as a 10-bit character format.

Device control unit 108 directs multiple commands from hosts 102 to more than one storage devices 106. Therefore, interconnecting unit 104 enables coupling between plurality of hosts 102 and plurality of storage devices 106.

The point-to-point connection between each host 102 and interconnecting unit 104 is over a single serial link using host interface unit 107. Similarly, the point-to-connection between storage devices 106 and interconnecting unit 104, through device interface unit 112, is over a single serial storage link. The serial storage link can be implemented using protocols such as SATA or SAS. The SATA and SAS protocols are well known in the art, and their applications in the present invention should be apparent to one skilled in the art.

Figure 2:
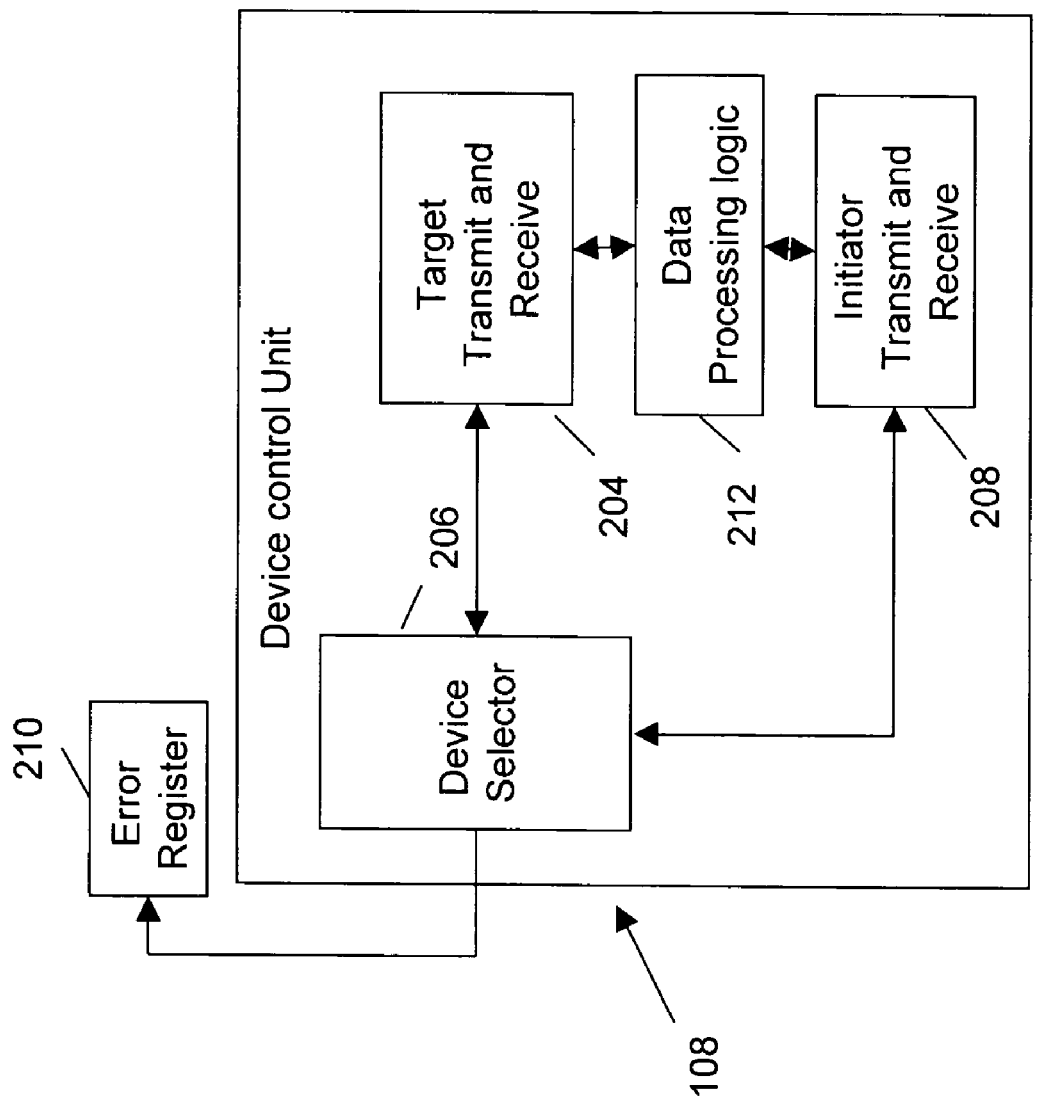
FIG. 2 is a block diagram illustrating the essential elements of a device control unit in accordance with an embodiment of the present invention.

FIG. 2 illustrates the elements of device control unit 108 in accordance with an embodiment of the present invention. Device control unit 108 comprises a target transmit and receive block 204, a device selector 206, and an initiator transmit and receive block 208. Further, device control unit 108 comprises an error register 210 and a plurality of data processing logic unit 212.

Target transmit and receive block 204 monitors the processed command/data (in the form of serial I/O structure) from host 102 in the 10 bit character format. In an embodiment that uses SATA serial link, the serial I/O structure is sent in the form of FIS. Target transmit and receive block 204 converts the received FIS, in the character format, into a fixed data format. In an embodiment of the invention, Target transmit and receive 204 converts the 10-bit character format into a 32-bit size data format. The elements of target transmit and receive block 204 will be further described by means of FIG. 3.

Device selector 206 monitors the received element of the serial I/O structure from target transmit and receive block 204, to identify the presence of a command. In case the received element of the serial I/O structure is a command, one of storage devices 106, to which the command is directed, is selected. This selection is based on a tag for the command that stores the identity of storage device 106 to which the command is directed. After this selection, the command is modified according to the type of storage device 106 that is selected. For example, a queued read or write command from host 102 destined to a non-queue capable storage device 106 is modified to relocate the tag and the command opcode before it is forwarded to initiator transmit and receive block 208.

The location of the tag, identifying the selected storage device, in the command depends on storage device 106 to which the command is being directed. In an embodiment of the invention, for SATA commands directed to non-queue capable storage device 106, higher bits of the address are used as the tag to represent storage device 106. In case the command is directed to queue capable storage device 106, the location of the tag is as per the SATA standard. Please note that the location of the tag as part of the address is design specific. It should be apparent to a person skilled in the art that there are other methods of tagging, such as using an unused field of the command. Alternatively, non-queued SATA commands directed to queue capable or non-queue capable storage devices 106 can be wrapped into a queue command received by interconnecting unit 104, which in turn unwraps the command into a regular SATA command to storage device 106. This option allows some hosts that are not otherwise capable of interleaving non-queued commands, to queue them as if they were queue capable. It should be apparent to a person skilled in the art that the method of wrapping of non-queue command is implementation specific and does not limit the scope of the invention.

The command is subsequently forwarded to selected storage device 106 through initiator transmit and receive block 208. Initiator transmit and receive block 208 is responsible for delivering the command to selected storage device 106. The elements of initiator transmit and receive block 208 are further described using FIG. 4. Once the command is forwarded to selected storage device 106, target transmit and receive block 204 starts monitoring hosts 102 for more commands and initiator transmit and receive block 208 monitors storage devices 106 for a response.

In the above discussion we are referring in detail to the reception of a command. It is worth mentioning that the other serial I/O structures received or transmitted are discussed when we discuss the operation flow.

The command forwarded to selected storage device 106 may or may not be accepted by it. Selected storage device 106 may not accept the command if it detected a CRC error or a bit error while receiving the command. In such a scenario, host 102 tries the command again. Also, some storage devices may not accept more than one command at a time. This knowledge is kept in host 102 and device selector 206 and multiple commands are not issued to that storage device. If host 102 initiates a command to a storage device that is busy, device control unit 108 does not accept the command and host 102 tries again until the busy storage device is no longer busy.

Device control unit 108 also includes an error register 210 that stores the status of various connections between host 102, device control unit 108, and storage devices 106. This can be used to locate an error, if any, encountered while the coupling is established between hosts 102 and storage devices 106. Errors tracked by error register 210 include bit errors and Cyclic Redundancy Code (CRC) errors and the port at which they occurred. Please note that there is a unique error register 210 connected to each device control unit 108. For example, if there is a plurality of device control units 108, each device control unit is connected to error register 210.

In an embodiment of the present invention, each device control unit 108 also includes a data processing logic unit 212 to process data before it is stored in storage devices 106. In an embodiment of the invention, data processing logic unit 212 is connected between target transmit and receive block 204 and initiator transmit and receive block 208. The processing is done to produce error correction codes, which provide data integrity, compression of data to reduce actual storage and encryption for data security purposes.

Figure 3:
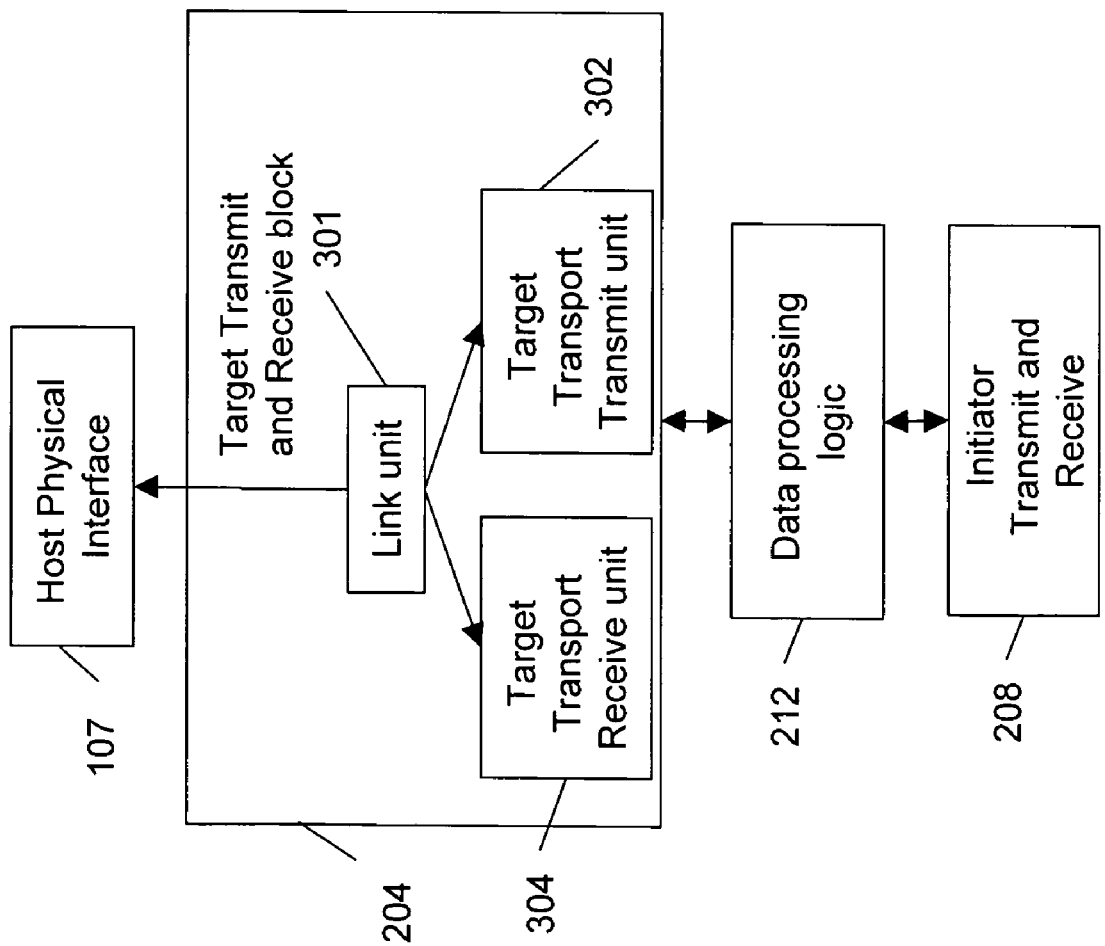
FIG. 3 is a block diagram of the target transmit and receive block in accordance with an embodiment of the present invention.

The elements of target transmit and receive block 204 are described, hereinafter, using FIG. 3. Target transmit and receive block 202 comprises a link unit 301, a target transport transmit unit 302 and a target transport receive unit 304.

Link unit 301, defined as per the SATA standard definition, is responsible for the following operations for the received data: convert a 10-bit character to 8-bit data, remove primitives, unscramble the data, check CRC, and pack four bytes into 32-bit data with correct character boundaries. Link unit 301 is responsible for the following operations on the transmit data: calculate CRC for the transmit data, scramble the data, convert 32 bit data to four 10-bit characters, add the appropriate primitives and pack the four 10-bit characters on correct boundaries for transmission. The link 301 receives an element of the serial I/O structure from host 102 and converts to 32 bit data for target transport receive unit 304. In an embodiment of the present invention, link unit 301 is implemented using a finite state machine on an integrated circuit. The design and logical interconnections of the finite state machine to achieve the above-described functionalities of link unit 301 will be apparent to a person skilled in the art. Target transport receive unit 304 receives an element of the serial I/O structure from link 301. Further, it has an adequate buffer to hold data received from host 102 in case storage device 106 is not ready. Target transport receive unit 304 interprets the incoming serial I/O structure and signals device selector 206 as to what element of the serial I/O structure is being exchanged. It further communicates with the data processing unit 212 via a finite state machine to pass the received I/O structure for any further processing. Depending on the type of the I/O structure, data processing unit 212 may pass the I/O structure directly to initiator transmit unit 502 or further process it prior to passing it. Target transport transmit unit 302 forwards the request received from any of storage devices 106 to host 102, allowing link unit 301 to add the link functions to the data. It further communicates with data processing unit 212 via a finite state machine to receive the received I/O structure from initiator receive unit 504. Depending on the type of the I/O structure, data processing engine 212 may pass the I/O structure directly to target transport transmit unit 302 or further process it prior to passing it.

Figure 4:
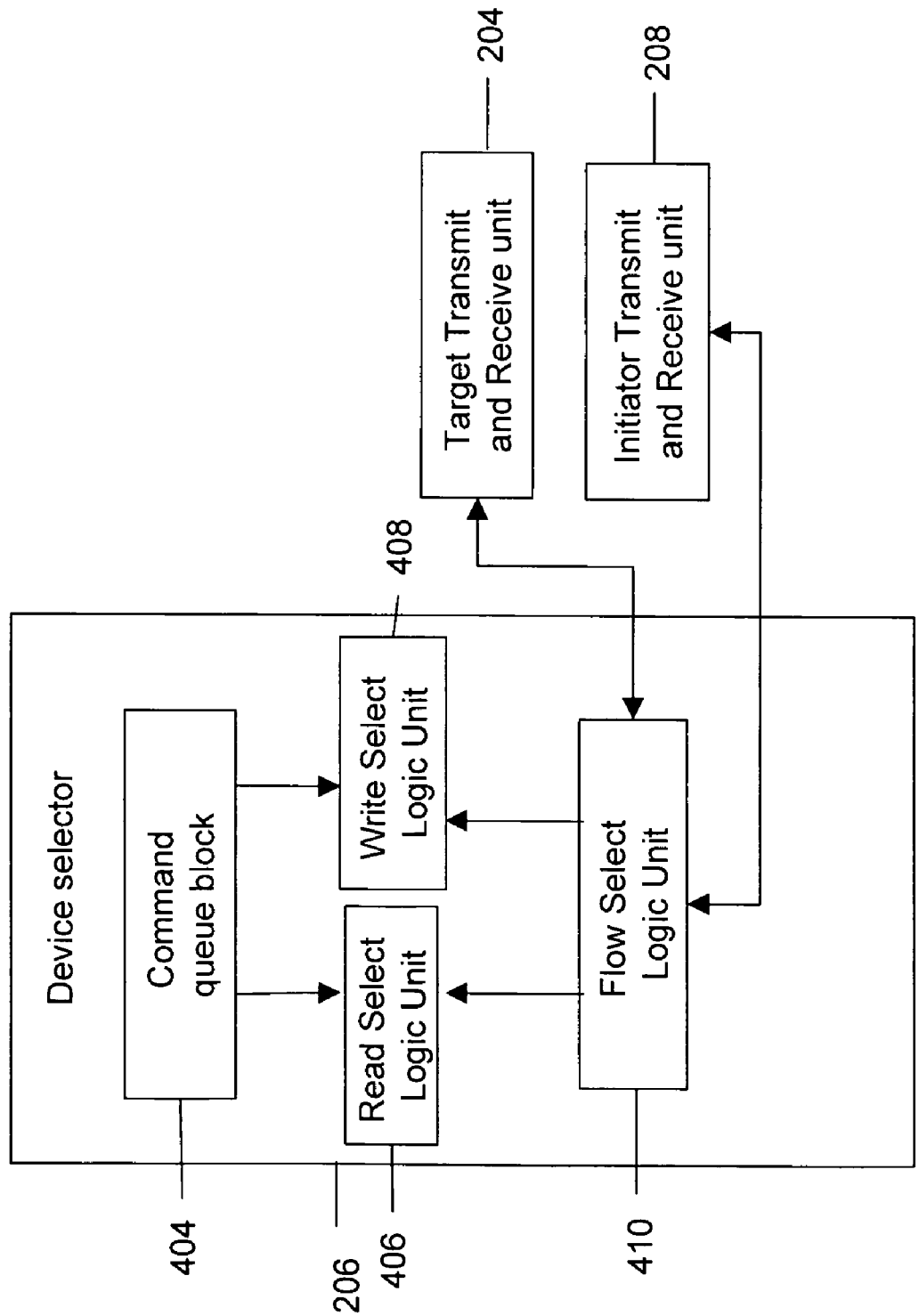
FIG. 4 is a block diagram of the device selector in accordance with an embodiment of the present invention.

The elements of device selector 206 are described, hereinafter, using FIG. 4. Device selector 206 comprises a command queue block 404, a read select logic unit 406, a write select logic unit 408 and a flow select logic 410.

Command queue block 404 stores a signature of a pending command while the command FIS is delivered to storage device 106. The pending command is stored if either selected storage device 106 has not yet responded to the command or other commands are being processed. Command queue block 404 is checked to identify if there is a command in the queue for execution.

Read and write select logic units 406 and 408 select storage device 106 to which the I/O structure is directed. Write select logic 408 selects a routing path from host 102 through interconnect routing unit 110 to selected storage device 106. Read select logic 406 selects a routing path from selected storage device 106 through interconnect routing unit 110 to host 102. Read select logic unit 406 and write select logic unit 408 generate the control signals for the multiplexer used in interconnect routing unit 110 to enable the routing path. Read select logic unit 406 and write select logic unit 408 ensures that the commands of the I/O structure can be delivered while storage devices 106 are monitored for communication.

Flow select logic unit 410 arbitrates the order of processing of the device requests as well as negotiations with host 102 in case of non-queue capable storage devices 106 and non-queue commands. Flow select logic unit 410 receives signals from target transport receive block 304 and initiator transmit and receive block 208 as to a serial I/O structure element that is being exchanged. Flow select logic 410 is implemented by using a finite state machine whose operational flow is defined in FIG. 7.

Please note that the identification of queue capability of storage devices is performed when storage devices 106 are initially powered up and identified by the host. Subsequently, the knowledge is passed on to interconnecting unit 104. In case a storage device 106 is queue enabled, multiple commands can be delivered by device control unit 108 to a storage device. Queue-capable storage device 106 completes the I/O structure by executing the command and interconnecting unit 104 merely acts as a router of the FIS between host 102 and storage device 106.

If storage device 106 is non-queue capable, interconnecting unit 104 modifies the tag and the command opcode and forwards the modified command FIS to non-queue capable storage device 106. When non-queue capable storage device 106 is ready to communicate with host 102, flow select logic unit 410 negotiates with host 102 before coupling storage device 106 and host 102 for communication. In particular, if host 102 sends a command to a non-queue capable storage device 106 that has previously received a command, interconnecting unit 104 retries that command until storage device 106 is no longer busy.

Figure 5:
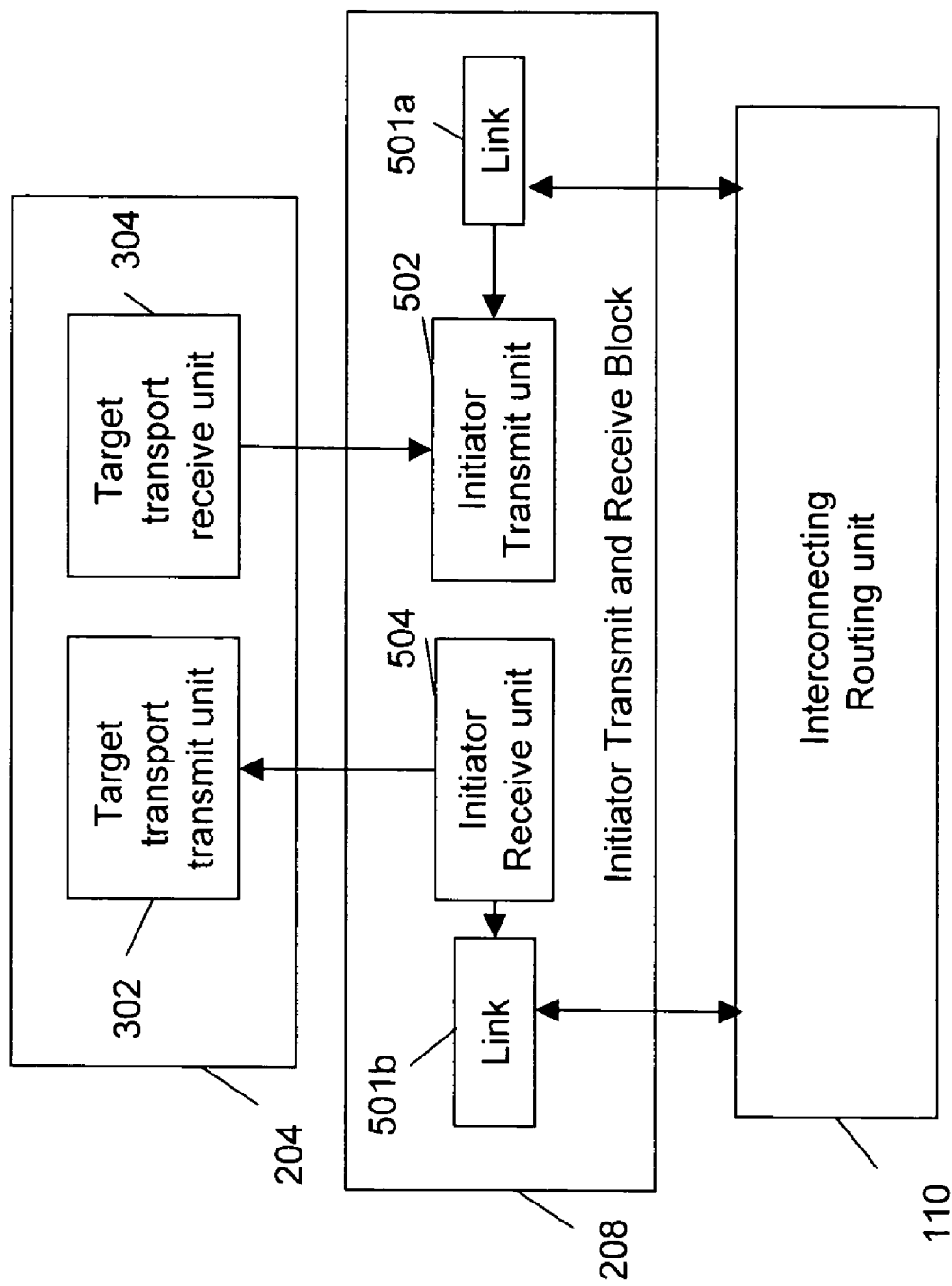
FIG. 5 is a block diagram of the initiator transmit and receive block in accordance with an embodiment of the present invention.

The elements of initiator transmit and receive block 208 is described, hereinafter, using FIG. 5. Initiator transmit and receive block 208 comprises a pair of links 501a and 501b, an initiator transmit unit 502 and an initiator receive unit 504.

Links 501a and 501b are used to encode and decode storage protocol primitives. Link 501a is connected to initiator transmit unit 502 and interconnect routing unit 110. Link 501b is connected to initiator receive unit 504 and interconnect routing unit 110. Links 501a and 501b have functionality similar to link unit 301. Additionally, link 501a has special states that resolve the collision of a serial I/O structure received from host 102 with that of one received from storage device 106. This case of a deadly embrace is resolved in the following way.

If host 102 is transmitting a software reset instruction to storage device 106, serial I/O structure received from storage device 106 is aborted by interconnecting unit 104, through link 501a, and the software reset instruction is forwarded to storage device 106. If the transmitted serial I/O structure is other than software reset instruction to storage device 106, then interconnecting unit 104 aborts both operations and allows the host software to resolve the anomaly.

In an embodiment of the present invention, links 501a and 501b are implemented using a finite state machine on an integrated circuit. The design of the finite state machine to achieve the above-described functionalities of link unit 301 will be apparent to a person skilled in the art.

Initiator transmit unit 502 accepts the I/O structure, which was received by target transport receive unit 304, by communicating via a finite state machine. The I/O structure may be further modified by data processing unit 212 or passed through directly. If selected by write select logic 406, storage device 106 receives the I/O structure from initiator transmit unit 502 and signals the successful receipt of the I/O structure. This receipt is forwarded back through initiator transmit unit 502 and target receive unit 304 to host 102. At this point, an I/O structure is delivered to storage device 106 and if the I/O structure was a command, device select unit 206 has a signature of the pending command in its command queue 404. Flow select logic unit 410 instructs initiator receive unit 504 to monitor storage devices 106 for activity. The activity comprises a signal from selected storage device 106 indicating that it is ready to communicate. Initiator receive unit 504 interprets the incoming serial I/O structure (corresponding to an activity signal) and signals flow select logic unit 410 in device selector 206 as what serial I/O structure element is being exchanged. Initiator receive unit 504 further communicates with data processing unit 212 via a finite state machine to pass the received I/O structure for any further processing. Depending on the type of the I/O structure, data processing unit 212 may pass the I/O structure directly to target transmit 302 or further process it prior to passing it. In this manner, other serial I/O structures are exchanged between host 102 and interconnecting unit 104, as well as storage device 106 and host 102 until the command is executed to completion, i.e., either of the read or the write operation is performed to completion. The flow of the data is further described in FIG. 7.

The present invention enables execution of multiple commands at the same time. In particular, multiple commands can be delivered to storage device 106, which executes them one-by-one, in any order. Flow select logic unit 410 can transmit a command to the same (selected) or a different storage device while initiator receive unit 504 is monitoring all storage devices 106 for activity. Further, device selector 206 tracks the delivery of the commands, and keeps track of them until its queue is empty.

In this way, more than one storage device 106 can be active at the same time. Specifically, multiple commands can be delivered to multiple storage devices 106. Each of these active storage devices 106 is then serviced according to the pre-specified fairness algorithm.

Figure 6A:
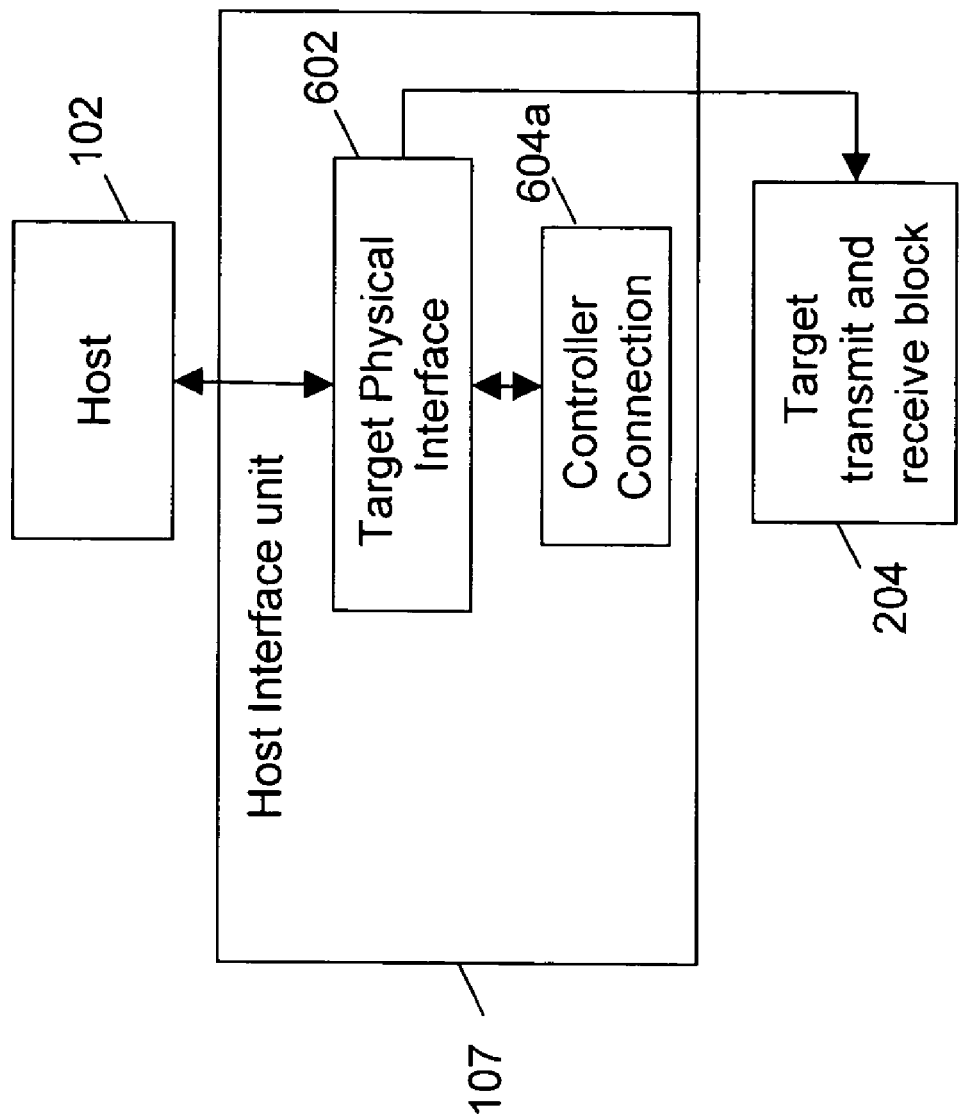
FIG. 6a is a block diagram of the host interface unit in accordance with an embodiment of the present invention.

Host interface unit 107 is, hereinafter, described using FIG. 6a. Host interface unit 107 comprises a target physical interface 602, and a controller connection 604a. Target physical interface 602 connects host 102 to device control unit 108 in accordance with point-to-point storage serial protocol such as SATA. Controller connection 604a synchronizes the serial data received from host 102 to the running internal clock via the elasticity buffer.

Figure 6B:
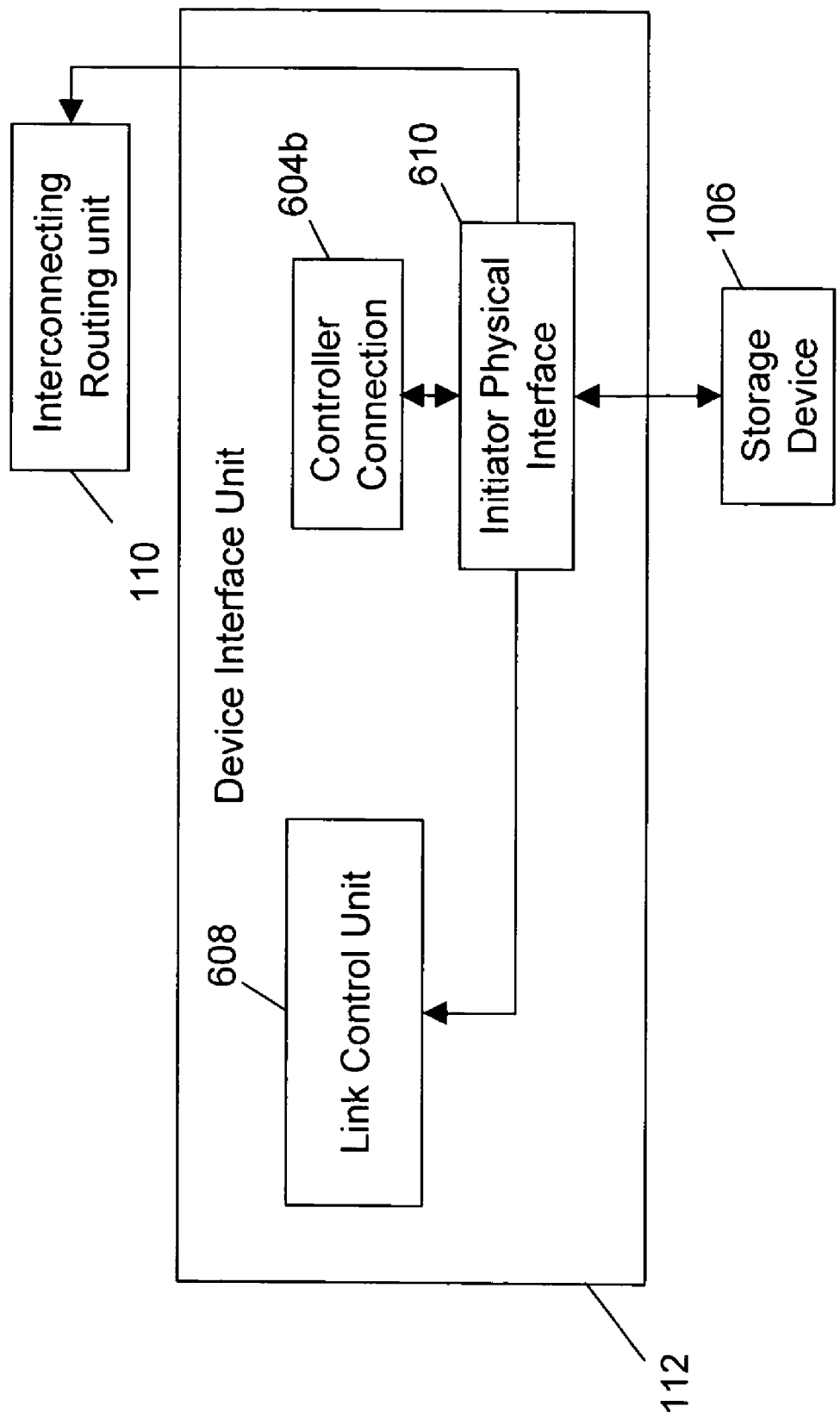
FIG. 6b is a detailed block diagram of the device interface unit in accordance with an embodiment of the present invention.

Similarly, the connection between storage device 106 and device control unit 108 is established using device interface unit 112. The elements of device interface unit 112 are described, hereinafter, using FIG. 6b. Device interface unit 112 comprises a controller connection 604b, a link control unit 608 and an initiator physical interface 610.

Controller connection 604b synchronizes the serial data received from storage device 106 to the running internal clock via the elasticity buffer. Link control unit 608 generates primitives when either of initiator transmit unit 502 or initiator receive units 504 is not connected to device control unit 108. Please note that a given storage device 106 is not connected to the initiator receive and transmit unit 208 at all times. However, serial storage devices need to actively send and receive valid primitives. The valid primitives are generated by link control unit 608 while initiator transmit unit 502 or initiator receive unit 504 are not in communication with a particular storage device.

The connection between interconnecting unit 104 and storage device 106 is established over initiator physical interface 610. Initiator physical interface 610 is enabled for SATA/SAS-STP protocol. Please note that the implementation of target physical interface 602 and initiator physical interface 610, in accordance with serial storage protocol such as SATA, is known in the art and it should be apparent to a person skilled in the art.

Figure 7A:
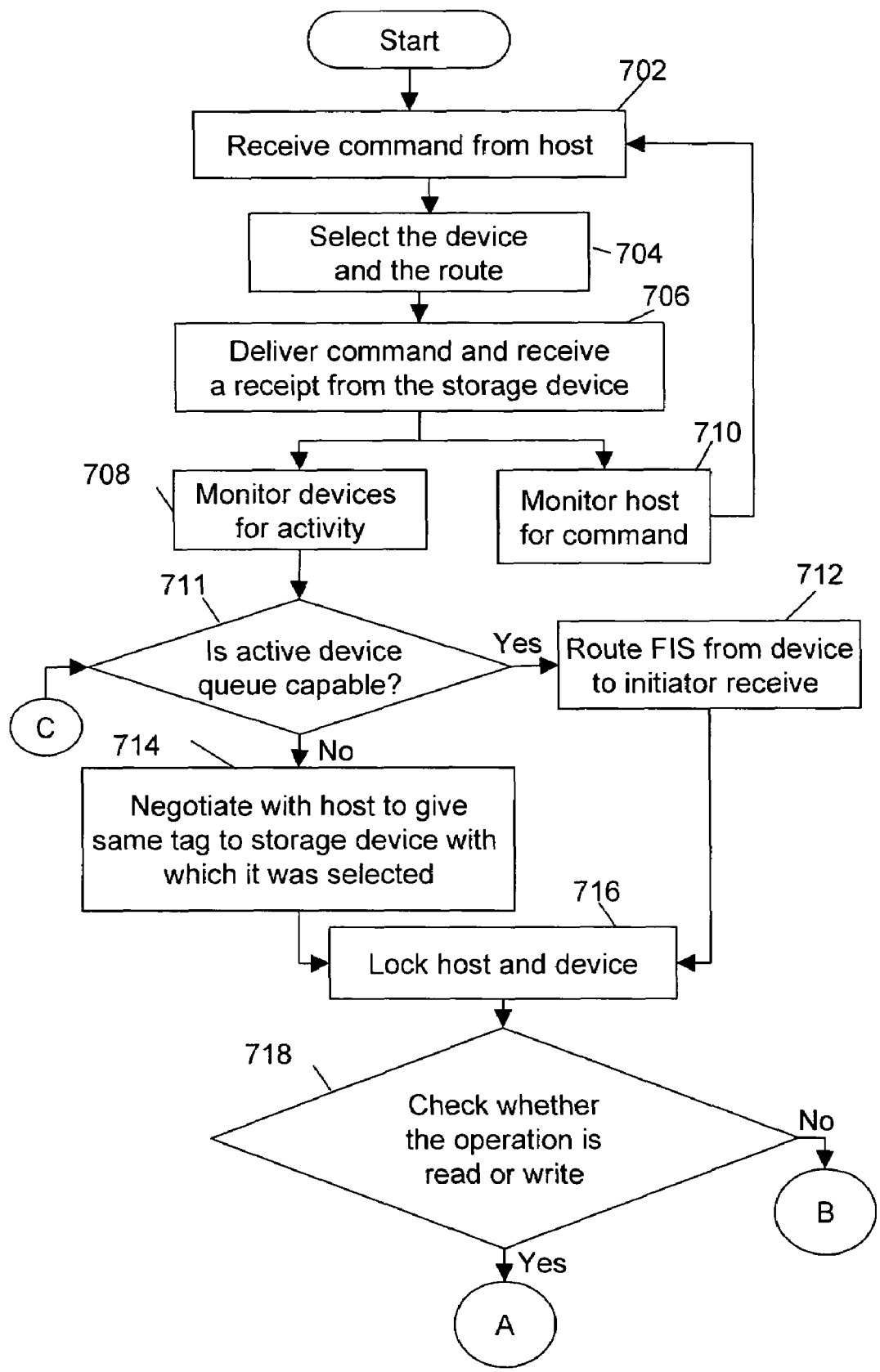
FIGS. 7a and 7b show a flowchart illustrating the method of data communication between a plurality of hosts and storage devices.
Figure 7B:
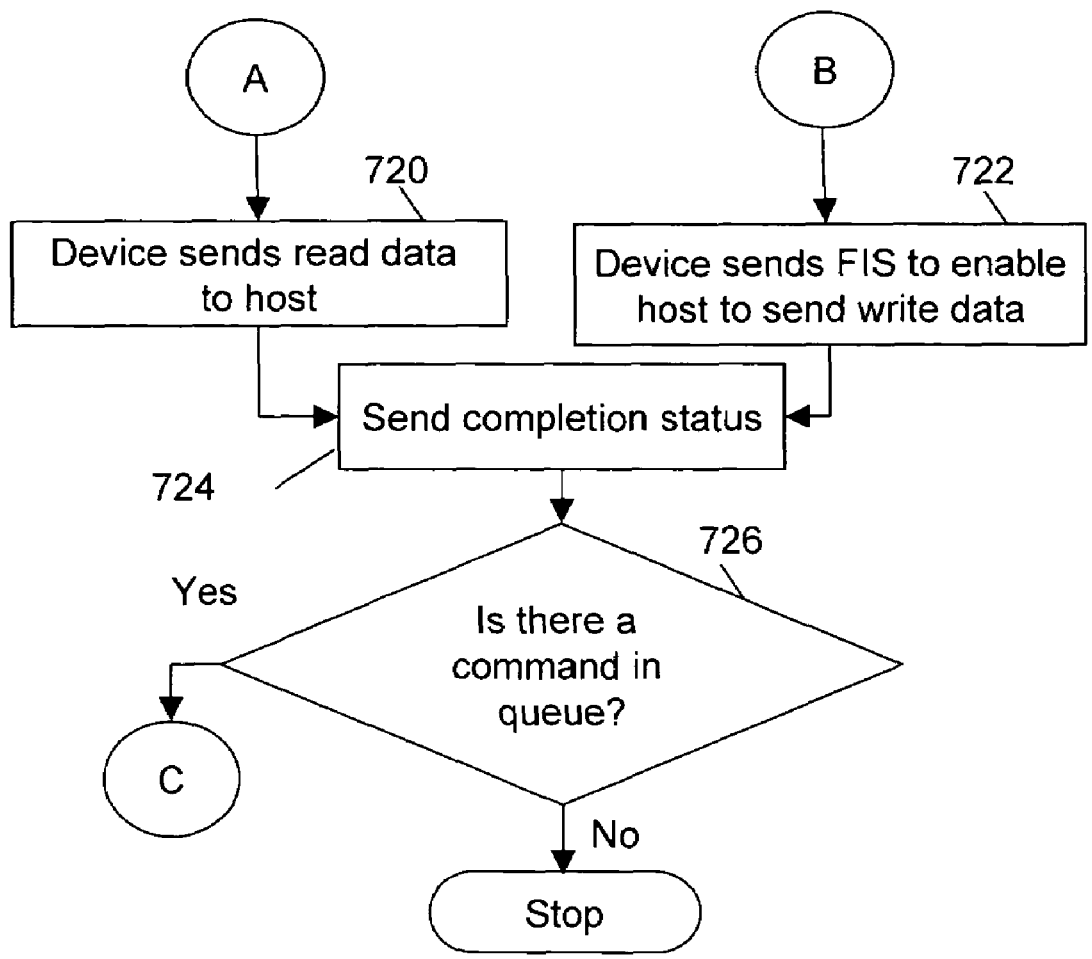

The above-described working of the invention is further explained using a flowchart in FIG. 7a and FIG. 7b. In step 702, target receive block 304 receives a command from host 102. In response to this, target transport receive block 304 notifies device selector 206 and also forwards the command to initiator transmit unit 502. Based on the received tag, device selector 206 selects a storage device 106 in step 704. Further, device selector 206 selects a proper routing through interconnect routing unit 110 to create a connection between initiator transmit unit 502 and device interface unit 112. Once the connection is created, initiator transmit unit 502 delivers the command to selected storage device 106 in step 706. Device interface unit 112 serializes the data to be transmitted to selected storage device 106. Initiator transmit unit 502 and target transport receive unit 304 remain engaged till an acknowledgement of proper receipt of the command is received from storage device 106. Subsequently, initiator transmit unit 502, device selector 206 and target transport receive unit 304 each, in turn, forward the receipt until it is received by host 102.

Meanwhile, in step 708, initiator receive unit 504 monitors plurality of storage devices 106 for a response. The order in which plurality of storage devices 106 are monitored is the same as the order in which the commands are delivered. Alternatively, a storage device that responds, thereby indicating that it is ready for communication, is served first. If a response is detected, the subsequent steps are determined by the nature of storage device, i.e., whether responding storage device 106 is queue or non-queue capable. At the same time, in step 710, target transport receive unit 304 monitors host 102 for another command.

In step 711, when responding storage device 106 is selected through device selector 206, it is determined if responding storage device 106 is queue capable or not.

If responding storage device 106 is queue capable, then in step 712, read select logic 406 routes the response from responding storage device 106 to initiator receive unit 504, which then forwards the response to host 102, through target transport transmit unit 302. There are several serial I/O structures that are related to negotiation between host 102 and responding storage device 106 as to which tag is being processed. In particular, if responding storage device 106 is not queue capable, then in step 714, flow select logic 410 negotiates with host 102. The negotiation is done to ensure that a tag with which responding storage device 106 was initially selected by host 102 is presented back to host 102 during the negotiations.

Subsequently, in step 716, flow control logic 410 locks host 102 and responding storage device 106. Locking is done to ensure that host 102 and responding storage device 106 exchange serial I/O structures until the user data is exchanged to completion. In step 718, it is determined if the operation is a read operation or a write operation. If the operation is a read operation, responding storage device 106 sends read data to host 102, at step 720, in a single or multiple serial I/O structures followed by a completion status at step 724. If the operation is a write operation, storage device 106 sends a DMA activated serial I/O structure, at step 722, to enable host 102 to send the write data for every serial I/O structure that needs to be transmitted from host 102 to responding storage device 106. Once host 102 receives the DMA activated serial I/O structure, it sends the write data to responding storage device 106. Responding storage device then sends a completion status to host 102 at step 724. Subsequently, at step 726, flow select logic unit 410 monitors to see if there is any command in the queue. It then samples storage devices 106 with the command in queue to see if they are ready for communication. If there is any storage device 106 ready for communication, flow select logic unit moves to step 711.

Please note that the above-described negotiation related to DMA activation is specific to SATA I protocol and has been described for illustration purpose only. It will be apparent to a person skilled in the art that negotiations performed using SATA II and other serial interfaces are different. The serial I/O structures used for DMA activation or completion status vary according to the serial protocol used.

To summarize, for every serial I/O structure that is from host 102 to storage device 106, the FIS travels from host interface unit 107, target transport receive unit 304 to write select logic 408 that selects a routing path through interconnect routing unit 110 to a storage device 106, The routing is through initiator transmit unit 502, interconnect routing 110, and device interface unit 112. For every serial I/O structure that is from storage device 106 to host 102, the serial I/O structure travels device interface unit 112, read select logic 406 that selects the proper routing through interconnect routing unit 110. The routing path is through initiator receive unit 504, target transport transmit unit 302 and finally to host interface unit 107.

The present invention has been described using SATA for illustration purposes only. It will be apparent to a person skilled in the art that any other serial link protocol such as SAS, SCSI can be used to work the invention without diverting from the scope of the invention. Further, the structure of the command and data exchanged (as serial I/O structure) between hosts 102 and storage devices 106 would depend on the serial link protocol used. Further, it will be apparent to a person skilled in the art that the serial I/O structures that need to be exchanged during negotiations between host 102 and storage device 106 would depend on the serial link protocol used.

In an embodiment of the present invention, each of target transport transmit unit 302, target transport receive unit 304, device selector 206, initiator transmit unit 502, and initiator receive unit 504 is implemented as a finite state machine on an FPGA. For example, in an embodiment of the invention, target transport transmit unit 302 is implemented as a finite state machine that receives a 32-bit serial I/O structure as the input. Similarly, device selector 206 can be implemented as a finite state machine that performs the above-described functions of device selector 206.

The above-described system and method have various advantages.

First, device control unit 108 is simple in design and its complexity is lesser, in comparison with existing device control units. In particular, device control unit 108 uses a single target transmit and receive block 204 and Initiator transmit and receive block 208 per host rather than one target transmit and receive block 204 per host and one initiator transmit and receive block 208 per storage device as in the case of existing systems. Consequently, the number of gates required for implementing device control unit 108 is substantially lower than that for the existing systems.

For example, consider the case when the gate counts for target transmit and receive block is x and the gate count for initiator transmit and receive block is y. The system described in the present invention would have (x+y)*(number of hosts) for gate count. On the other hand, prior art systems have (x+(number of devices*y))*(number of hosts) for gate count, which is much higher.

Second, device control unit 108 achieves a higher throughput than the throughput with the existing device control unit. In particular, distribution of multiple commands to multiple storage devices allows concurrent processing across plurality of storage devices 106. This is advantageous because storage devices 106 operate at a data rate, which is lesser than hosts 102. Consequently, each of hosts 102 can overlap multiple commands across plurality of storage devices 106 at the same time.

Third, the use of plurality of device control units 108 creates path redundancy as well as data parallelism. This would allow two, or in general, multiple hosts, to concurrently communicate with as many storage devices, as there are host, in parallel. Device selector 206 in each device control unit 108 allows more than one host to access each of storage devices 106. Consequently, even if one of the communication paths failure is detected by software, the communication can still be performed. The multiple communication paths also create parallelism and enable load balancing of the workload.

Fourth, the invention improves the time for recovery in the case of failures. This is achieved by using error register 210 to isolate the fault location. This fault isolation scheme ensures that the fault is detected, located and quick recovery is affected. Several types of fault related to serial interfaces such as CRC error, bit error, loss of synchronization, and more are detected. Some are retried by hardware and some cause a failure in the I/O, which requires software to re-issue the serial I/O structure.

Fifth, the present invention also allows a non-queue capable device, or a different generation of a storage device to be connected to a queue capable host. The negotiation is handled by interconnecting unit 104 and transparent to host 102. This allows for cheap drives to be connected to an expensive host Sixth, device control unit processes data destined for storage devices 106. Data destined for storage devices 106 can be processed to produce error correction code (ECC) to provide data integrity, compression of the data to reduce actual storage, or encryption for data security reasons.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An interconnecting unit for coupling a plurality of hosts to a plurality of storage devices, the coupling involving exchange of a plurality of serial I/O structures between the plurality of hosts and the plurality of storage devices, the interconnecting unit comprising:
    a. a plurality of device control units enabling distribution of a plurality of commands to the plurality of storage devices, each of the plurality of commands being an element of a serial I/O structure;
    b. a plurality of host interface units, each of the plurality of host interface units synchronizing data between a host and the interconnecting unit;
    c. a plurality of device interface units, each of the plurality of device interface units synchronizing data between a storage device and the interconnecting unit; and
    d. an interconnect routing unit to connect a device control unit to a device interface unit, wherein each of the plurality of device control units comprises:
    a. a target transmit and receive block monitoring the host for the element of the serial I/O structure;
    b. a device selector unit selecting the storage device to which the element of the serial I/O structure is to be directed; and
    c. an initiator transmit and receive block delivering the element of the serial I/O structure to the selected storage device and monitoring the plurality of storage devices for a response subsequent to the delivering of the element of the serial I/O to the selected storage device, the response being sent as an element of the serial I/O structure;
    wherein the target transmit and receive block is capable of monitoring the host for the next serial I/O structure while the initiator transmit and receive block is monitoring the plurality of storage devices for the response.

2. The interconnecting unit according to claim 1, wherein each of the plurality of device control units further comprises an error register, the error register enabling identification of a fault location in case a fault is encountered during the communication between the plurality of hosts and the plurality of storage devices.

3. The interconnecting unit according to claim 1, wherein the target transmit and receive block comprises:
    a. a target transport receive unit forwarding the element of the serial I/O structure to the device selector for selecting the storage device; and
    b. a target transport transmit unit to forward a receipt from the selected storage device to the host connected to the target transmit and receive block, the receipt being an acknowledgment that the delivered element of the serial I/O structure has been accepted by the selected storage device.

4. The interconnecting unit according to claim 3, wherein the target transmit and receive block further comprises a link unit for converting the element of the received serial I/O structure in the character bit format to a fixed size format.

5. The interconnecting unit according to claim 1, wherein the device selector unit comprises:
    a. a write select logic unit selecting a routing path from the host through the interconnect routing unit to the selected storage device;
    b. a read select logic unit selecting a routing path from the selected storage device through the interconnect routing unit to the host; and
    c. a flow select logic unit negotiating between the host and the selected storage device in case the storage device is not queue-capable.

6. The interconnecting unit according to claim 5, wherein the device selector unit further comprises a command queue block storing a pending command while either the selected storage device has not yet responded or the selected storage device has responded but other commands is being processed.

7. The interconnecting unit according to claim 1, wherein the initiator transmit and receive block comprises:
    a. an initiator transmit unit for delivering the identified element of the serial I/O to the selected storage device; and
    b. an initiator receive unit for monitoring the plurality of storage devices for the an element of a serial I/O element.

8. The interconnecting unit according to claim 7, wherein the initiator transmit and receive block further comprises:
    a. a first link connected to the initiator transmit unit and the interconnect routing unit; and
    b. a second link connected to the initiator receive unit and the interconnecting routing;
    each of the links converting the serial bit stream into the character bit format.

9. The interconnecting unit according to claim 1, wherein each of the plurality of device control units further comprises a data processing logic unit, the data processing logic unit providing either security or compression to the data before being delivered to each of the plurality of storage devices.

10. A data storage system, the data storage system comprising:
- a. a plurality of hosts, each of the plurality of hosts being queue capable;
- b. a plurality of storage devices;
- c. an interconnecting unit for coupling the plurality of hosts to the plurality of storage devices, the coupling involving exchange of a plurality of serial I/O structure between the plurality of hosts and the plurality of storage devices, the interconnecting unit comprising:
  - i. a plurality of device control units enabling distribution of a plurality of commands to the plurality of storage devices, each of the plurality of commands being an element of serial I/O structure;
  - ii. a plurality of host interface units, each of the plurality of host interface units synchronizing the data between the host and the interconnecting unit, each of the plurality of host interface units converting the elements of the serial I/O structure in a serial bit stream format to a character bit format;
  - iii. a plurality of device interface units, each of the plurality of device interface units synchronizing the data between the storage device and the interconnecting unit, the device interface unit converting the element of the serial I/O structure in the serial bit stream format to the character bit format; and
  - iv. an interconnect routing unit to connect a device control unit to a device interface unit, wherein each device control unit is configured to select a routing path through the interconnect routing unit out of possible routing paths between the device control unit and the device interface unit upon receiving a command from a host to create a connection between the host and a storage device to allow processing of the command, which is an element of a serial I/O structure.

11. A method for data storage between a plurality of hosts and a plurality of storage devices, the method comprising the steps of:
- a. receiving a command from a host, the command being directed to a storage device;
- b. selecting the storage device to which the received command is directed;
- c. delivering the command to the selected storage device;
- d. receiving a receipt from the selected storage device if the command is delivered without error;
- e. monitoring the plurality of hosts for a next command and plurality of storage device for a response to the delivered command;

repeating steps a to d if the next command is received from the host; performing steps f to h if the response is received from one of the storage devices;
- f. identifying whether the storage device is queue capable;
- g. routing the response to the host, the routing being based on the identification of the storage device;
- h. locking host and the responding storage device for operation, the operation being based on the command;
- i. checking if there is a command in a queue;

repeating steps f to h if there is a command in the queue.

12. The method according to claim 11, wherein the step of routing comprises routing the response from the storage device to the host if the storage device is queue capable.

13. The method according to claim 11, wherein the step of routing comprises negotiating with the host to give a tag to the responding storage device if the storage device is not queue capable, the tag being the same tag used by the host to select the storage device.

14. The method according to claim 10, wherein the step of locking comprises the steps of:
- a. identifying whether the operation is a read operation or a write operation;
- b. the storage device sending a read data to the host if the read operation is to be performed; and
- c. the storage device sending a response to the host enabling the host to write a data if the write operation is to be performed.

* * * * *